Aug. 18, 1936.   R. W. BROWN   2,051,781
INTEGRATING CONTROL METHOD AND APPARATUS FOR
ACHIEVING UNIFORMITY OF AVERAGE CONDITIONS
Filed July 27, 1934   13 Sheets-Sheet 1
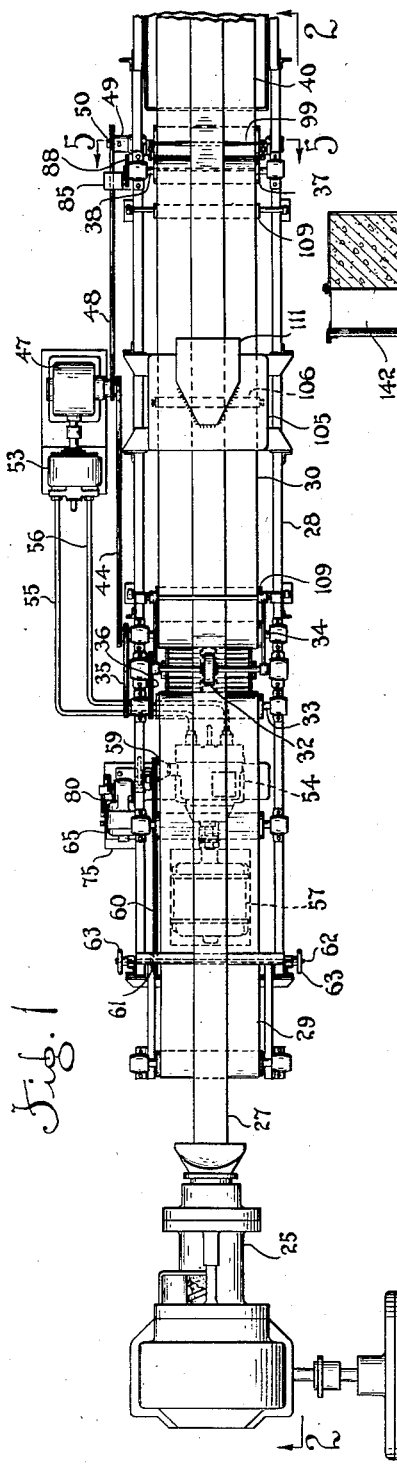
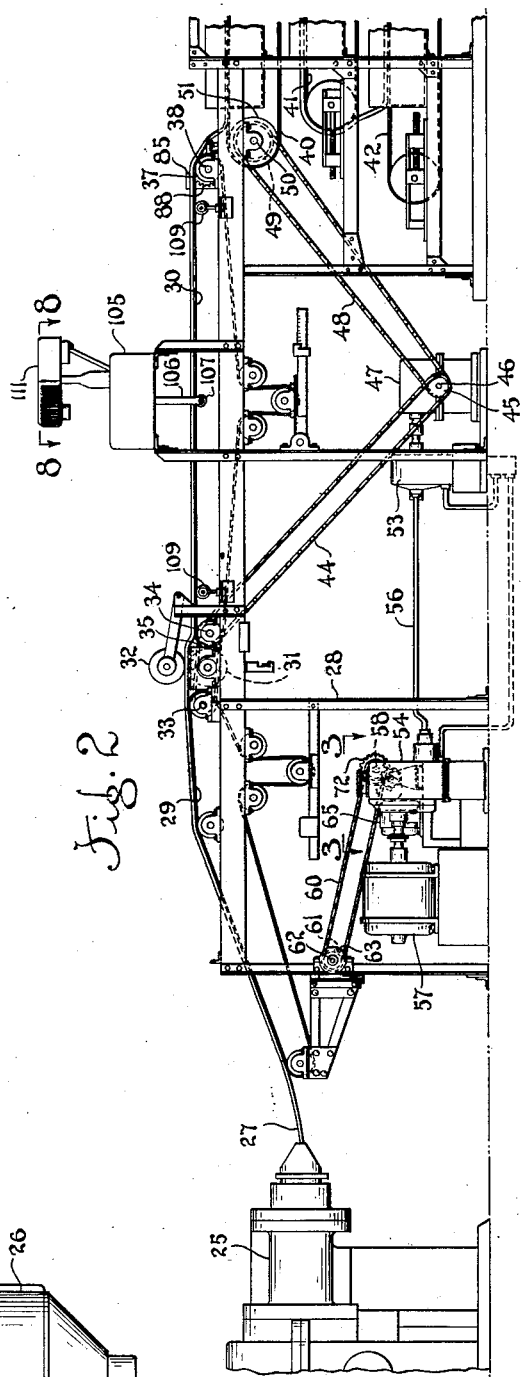
INVENTOR
Roy W. Brown
ATTORNEYS Aug. 18, 1936.                R. W. BROWN                     2,051,781
              INTEGRATING CONTROL METHOD AND APPARATUS FOR
                ACHIEVING UNIFORMITY OF AVERAGE CONDITIONS
                    Filed July 27, 1934          13 Sheets-Sheet 2
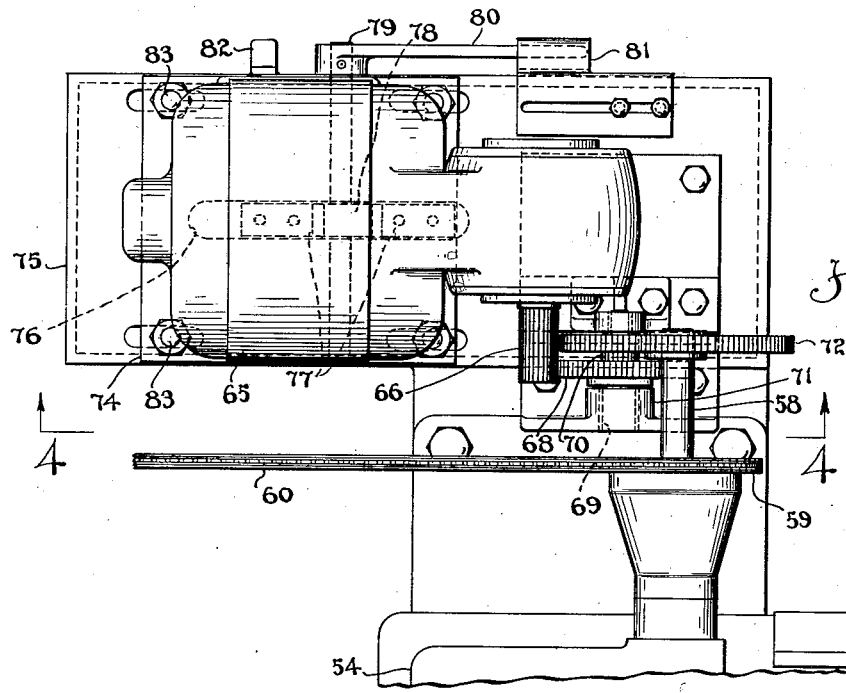
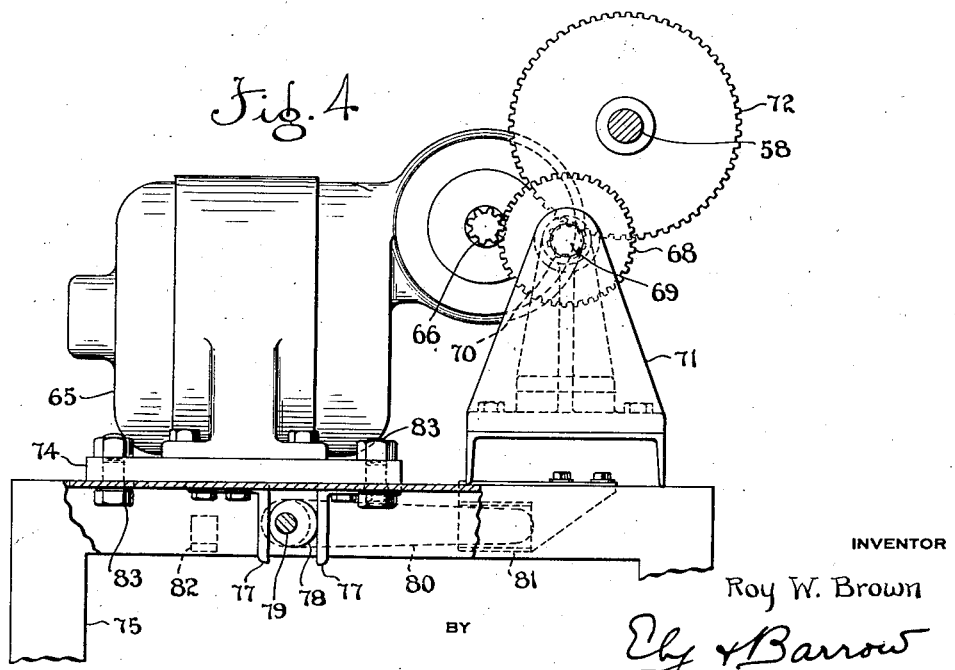
INVENTOR
Roy W. Brown
BY
Ely & Barrow
ATTORNEYS

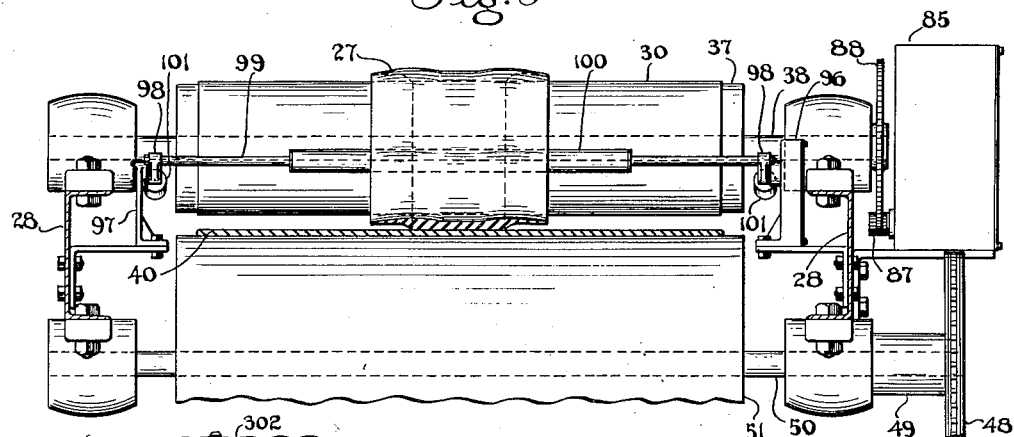
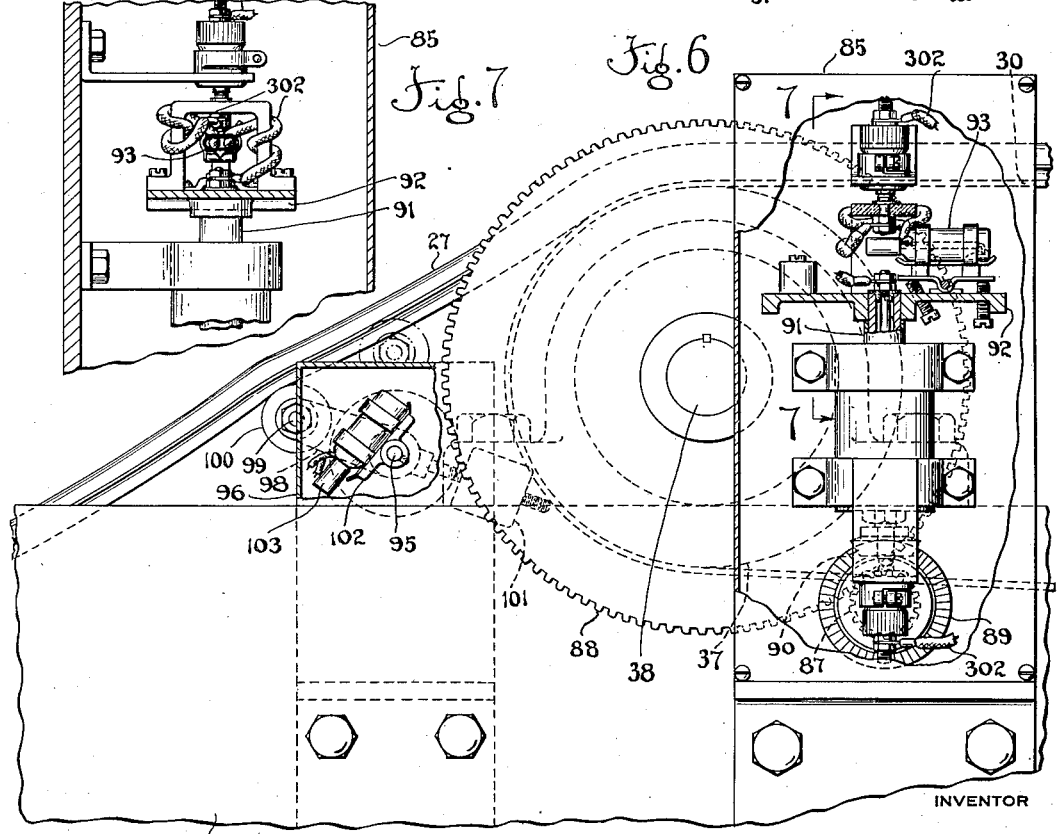

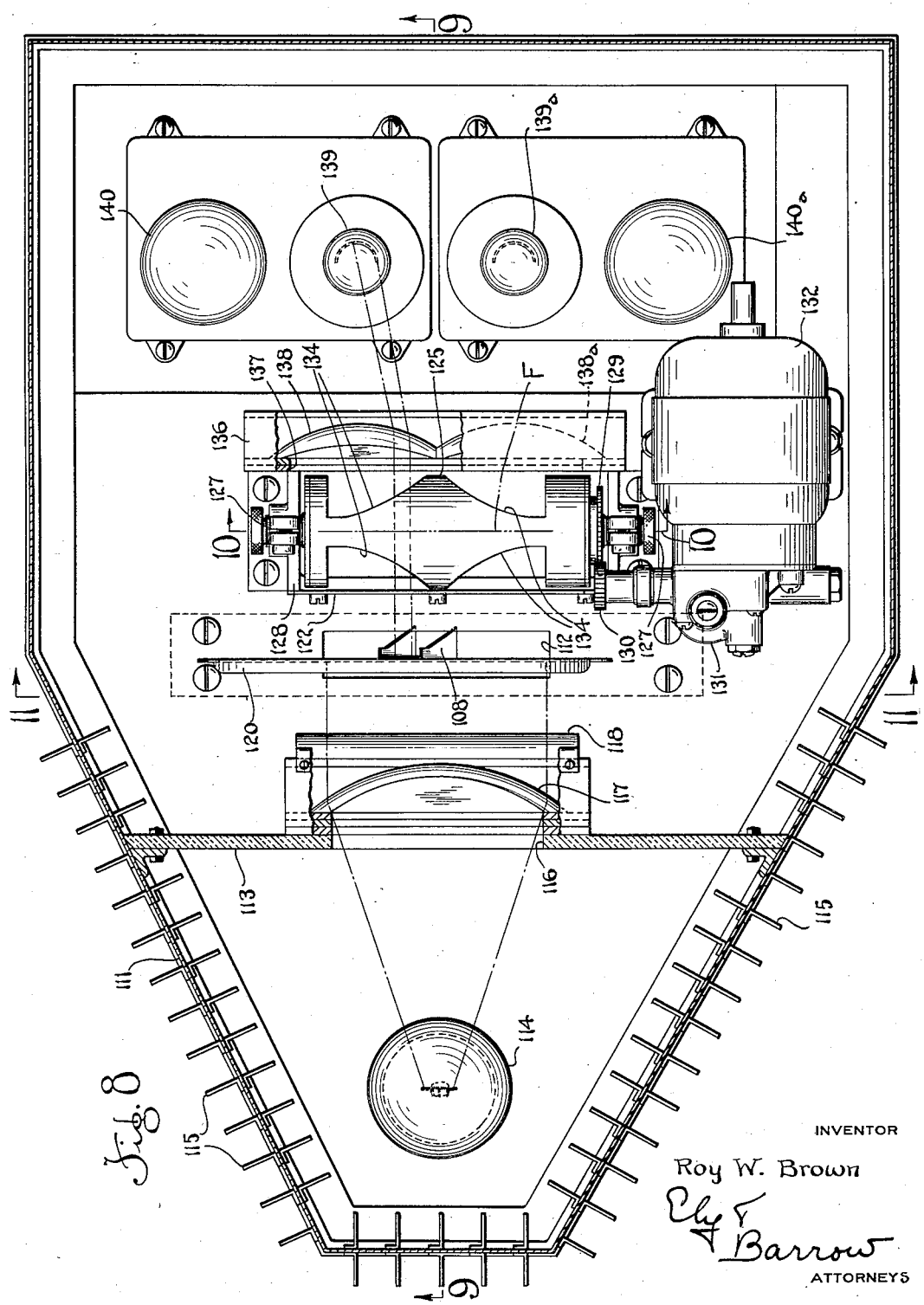

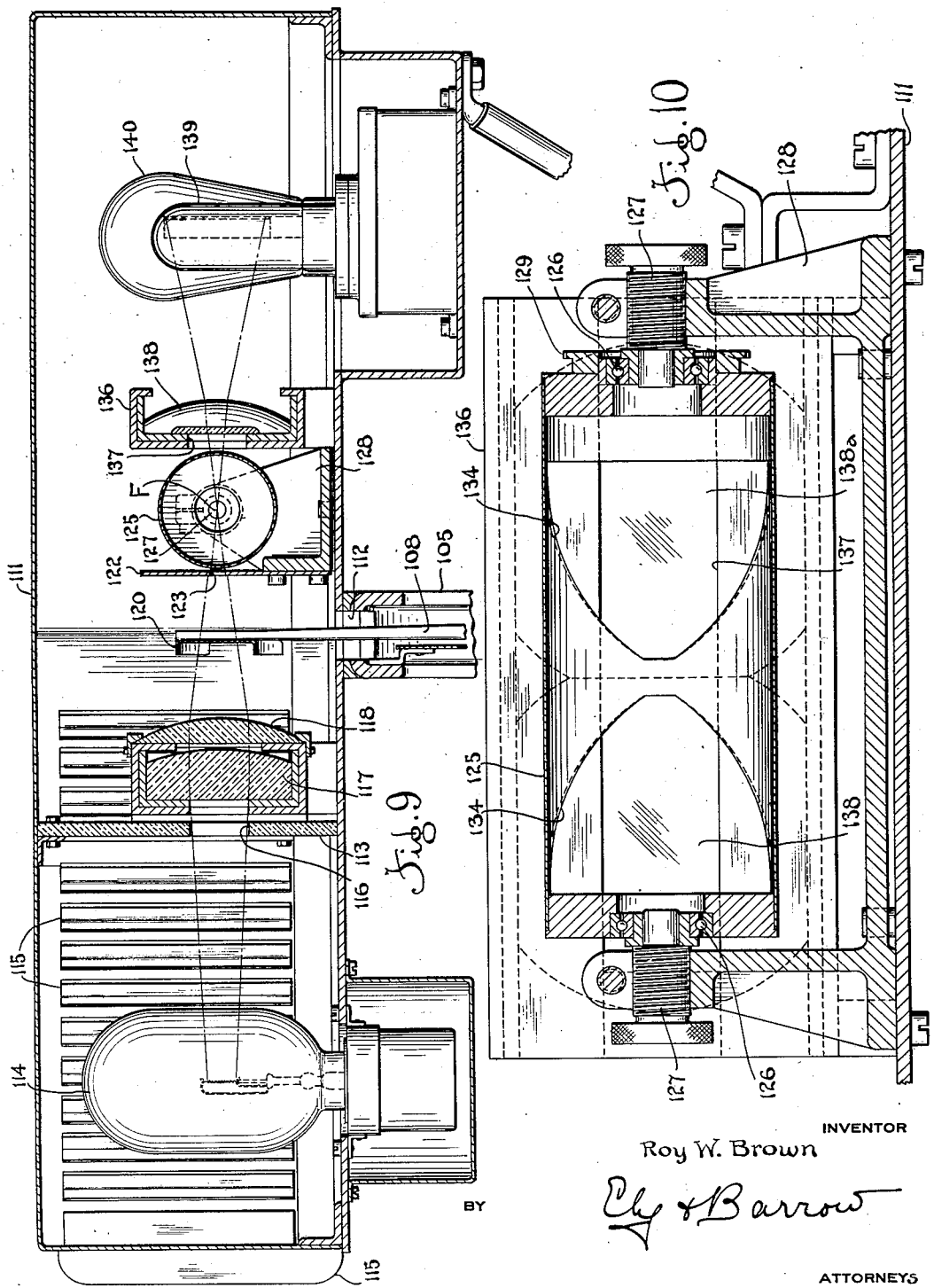

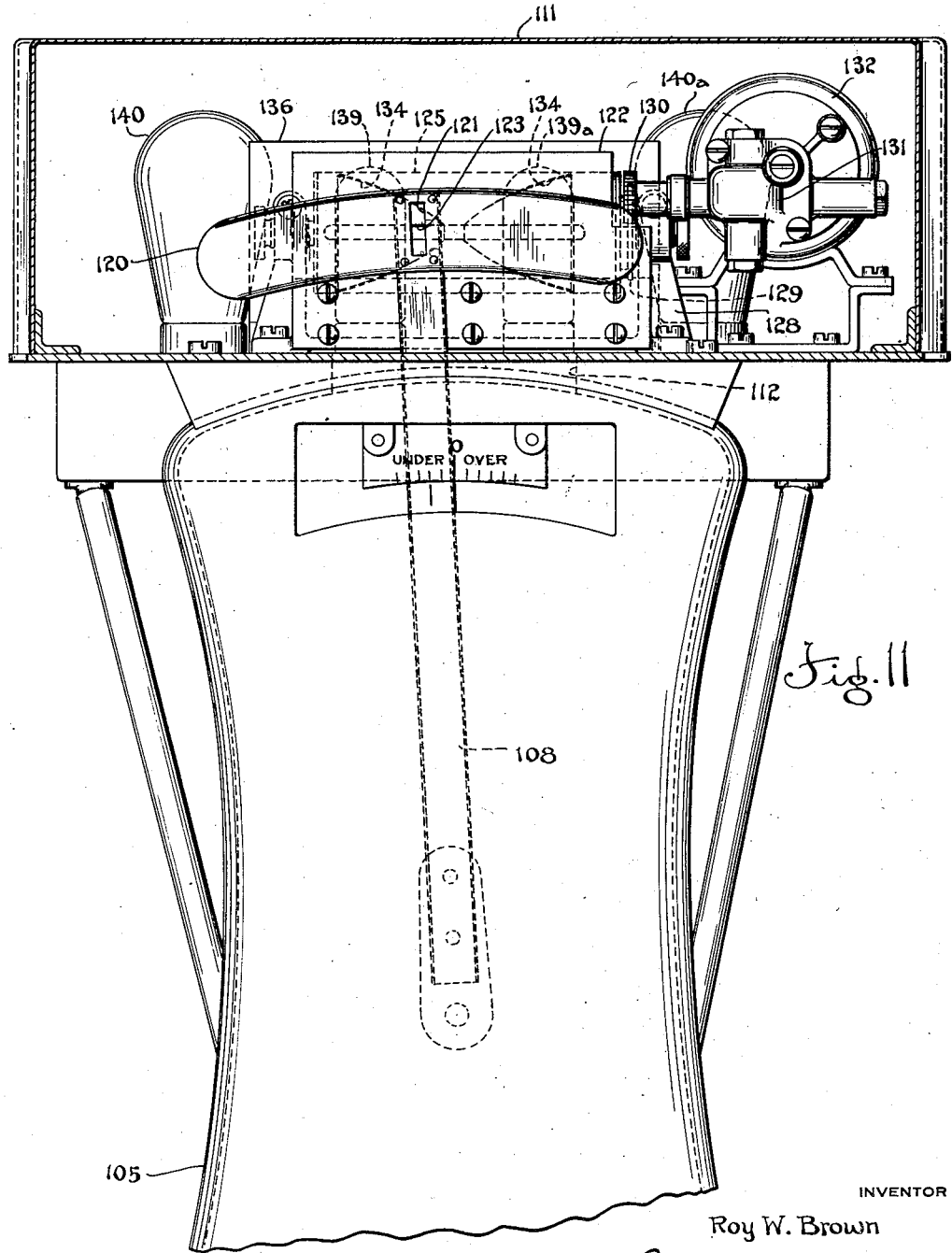

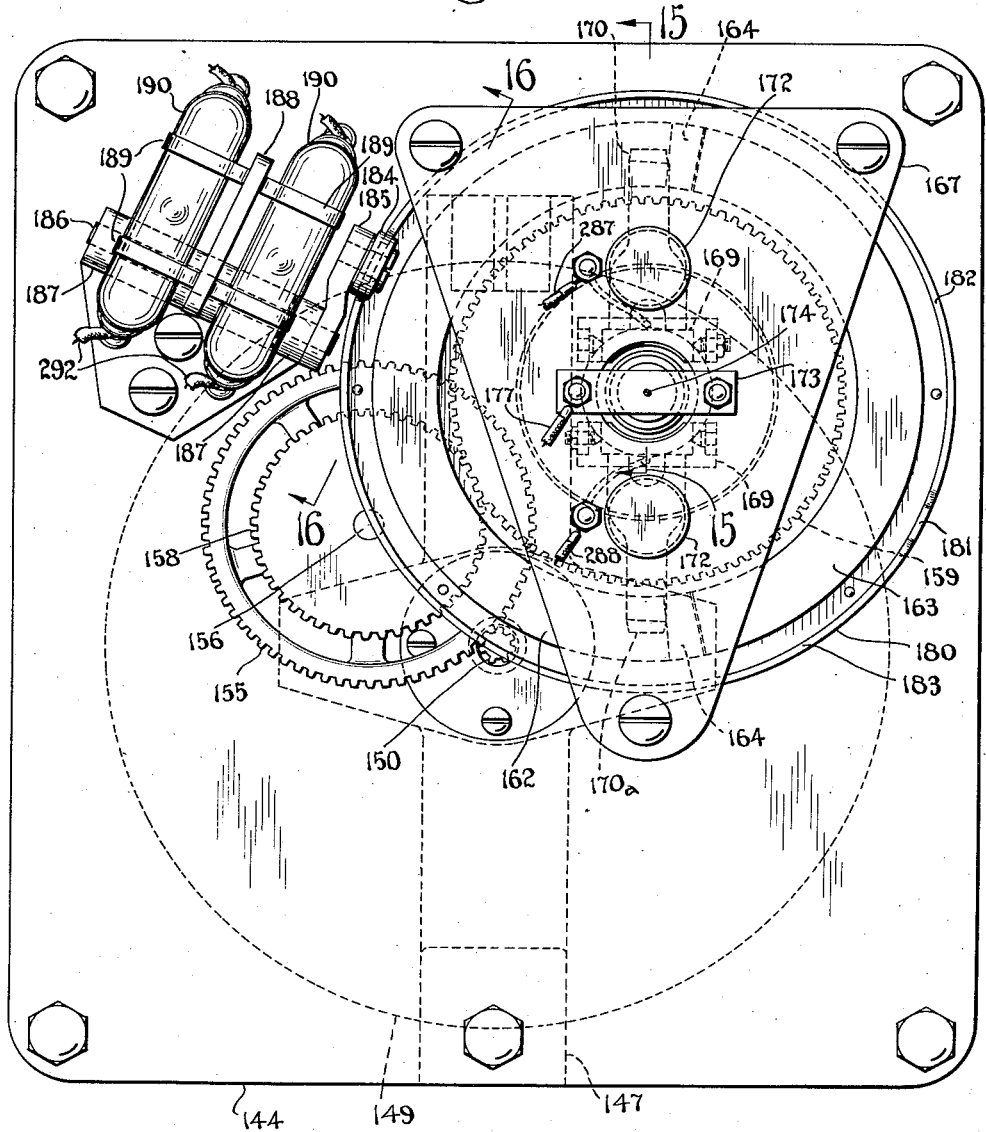

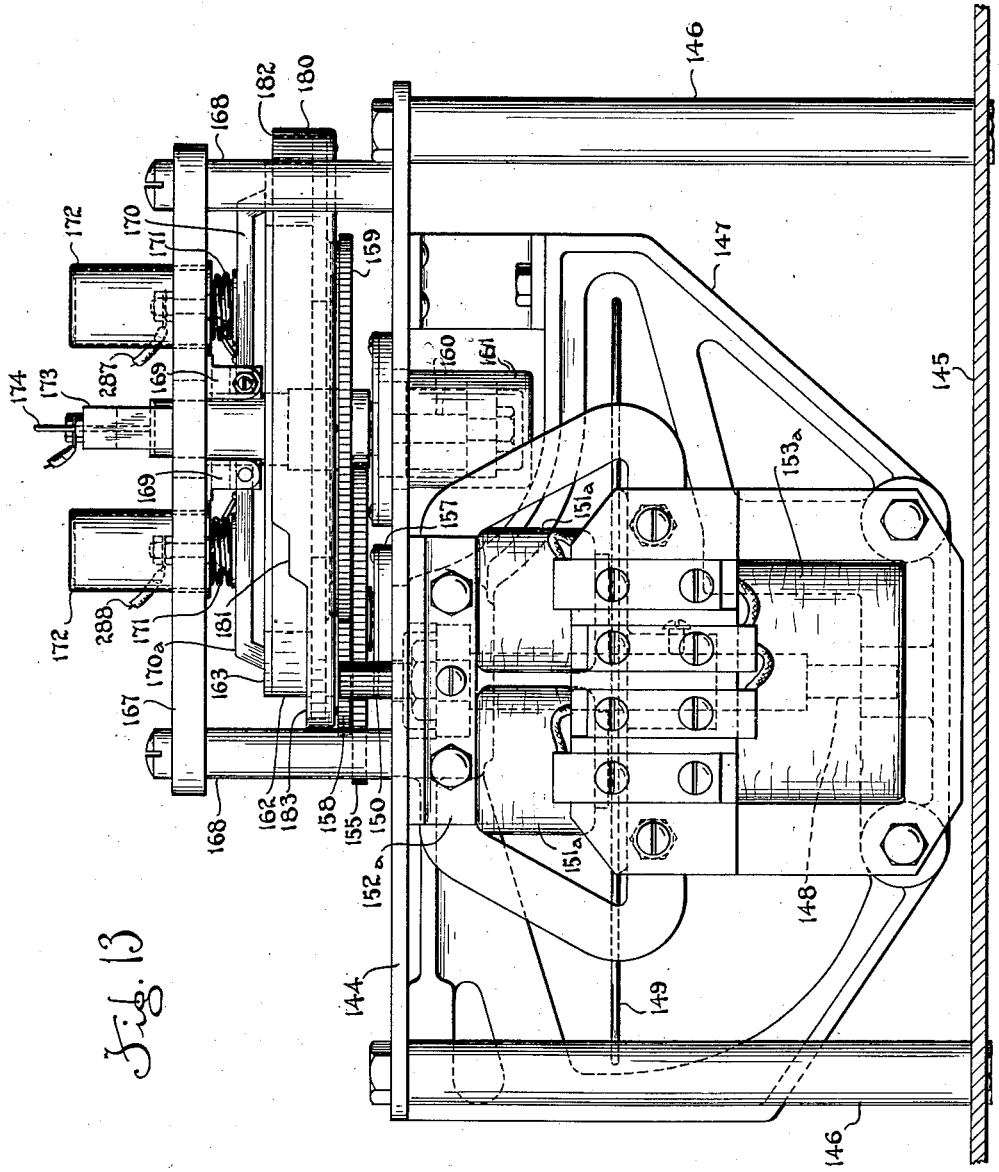

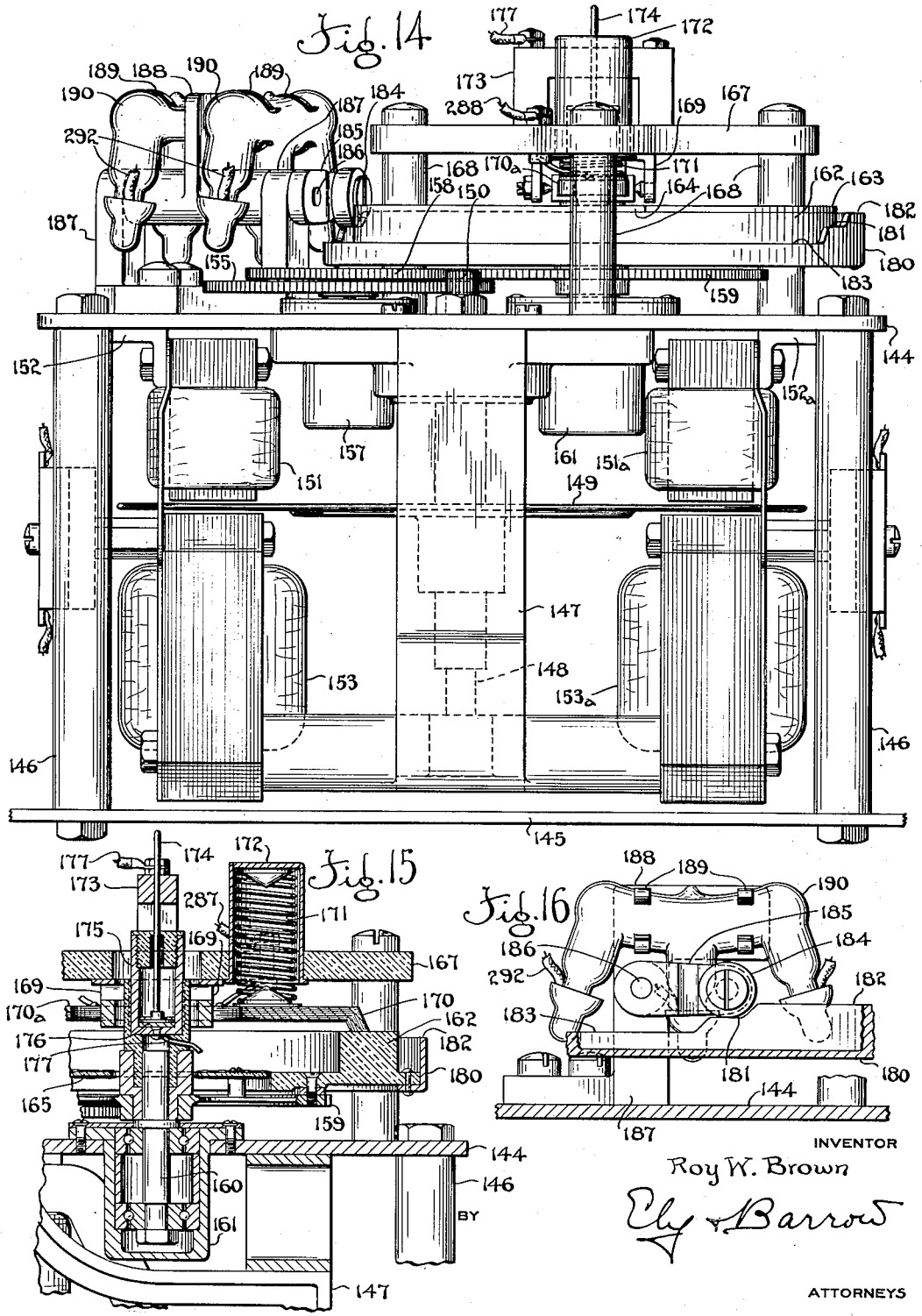

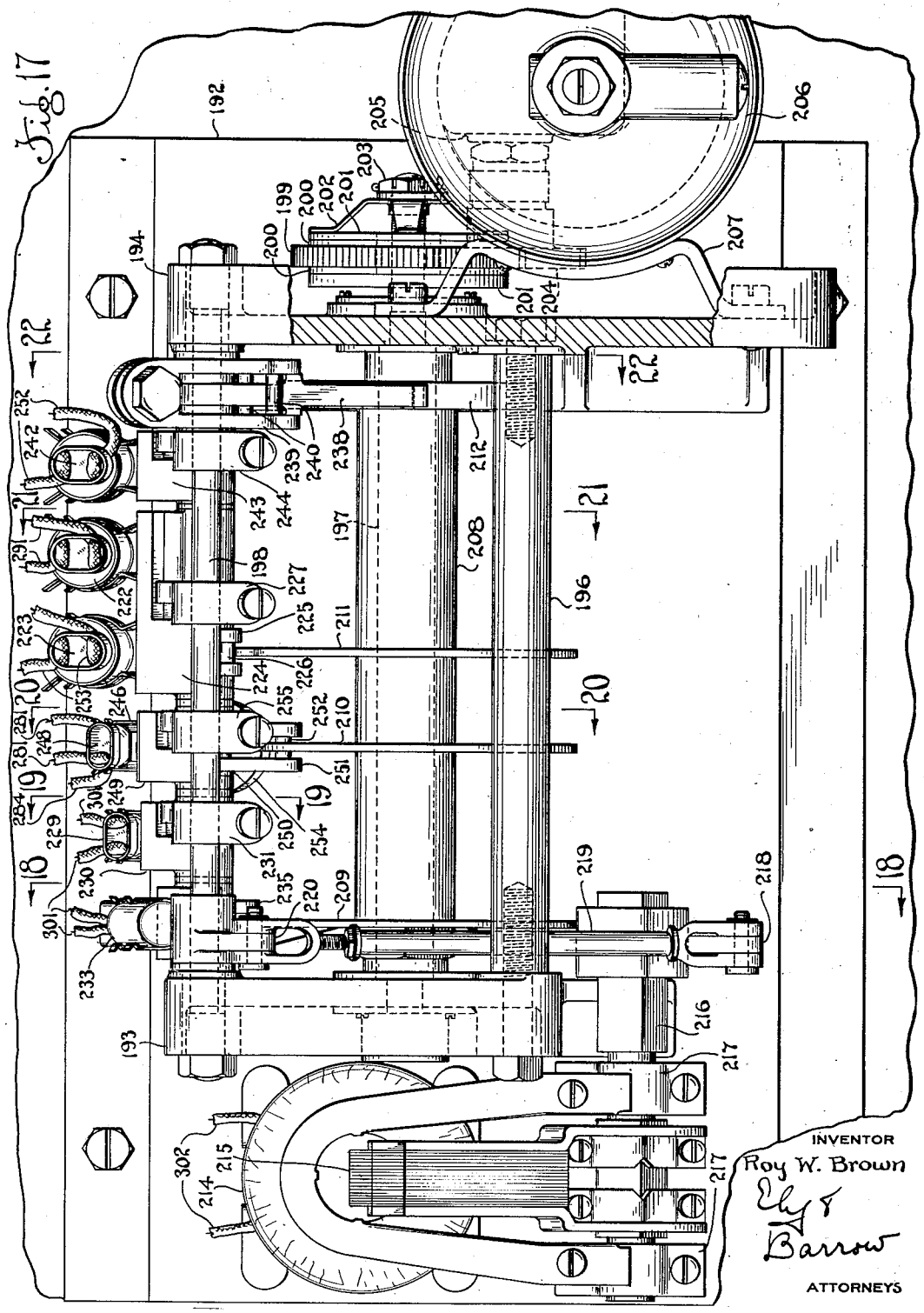

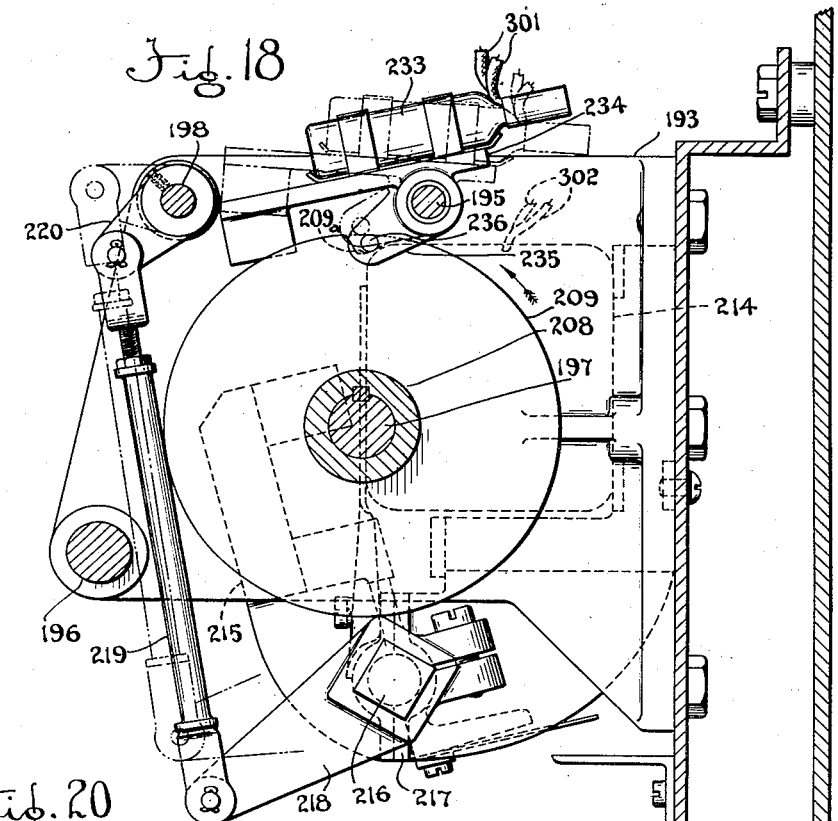
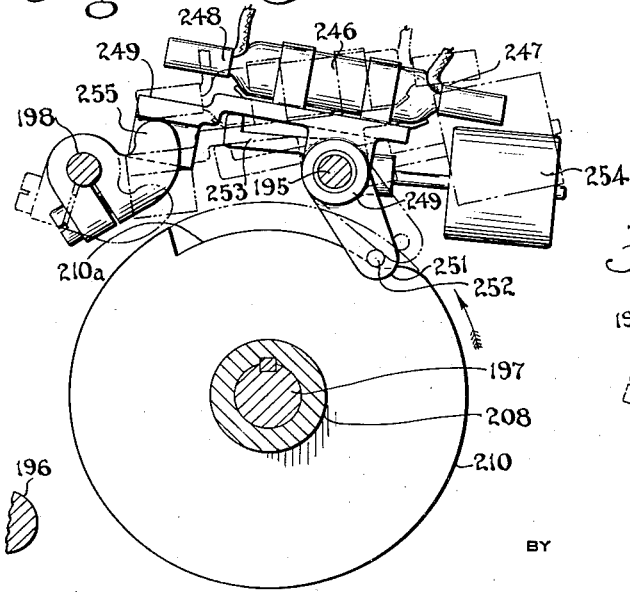
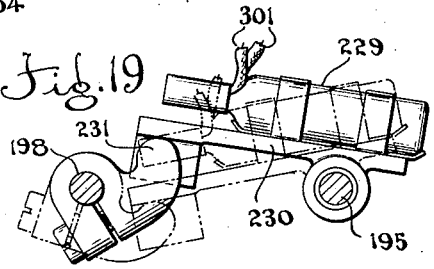
INVENTOR
Roy W. Brown
BY
Ely + Barrow
ATTORNEYS Patented Aug. 18, 1936

2,051,781

UNITED STATES PATENT OFFICE 2,051,781

INTEGRATING CONTROL METHOD AND APPARATUS FOR ACHIEVING UNIFORMITY OF AVERAGE CONDITIONS

Roy W. Brown, Akron, Ohio, assignor to The Firestone Tire & Rubber Company, Akron, Ohio, a corporation of Ohio Application July 27, 1934, Serial No. 737,242

15 Claims. (Cl. 18—2)

This invention relates to integrating control methods and apparatus for the adjustment of any average condition in contradistinction to adjustment of an immediate transient condition. It relates more particularly to method and apparatus for controlling a condition by means of integrating a series of concurrent or successive transient conditions in order to obtain a uniform average condition. The condition operated upon may be one of temperature, volume, power, voltage, flow, width, thickness, or any other condition that is met with in the arts and sciences and which may require adjustment.

The invention may, for example, be employed in the adjustment of temperature of a heat treating furnace, thermo-couples or pyrometers being installed about a number of positions in the furnace, and the invention being employed to adjust the average temperature at all of these points by successively taking readings on each of the heat measuring instrumentalities, integrating all of the readings, and making any adjustment necessary to produce any desired alteration in the average temperature taken at all of the points of measurement. The invention may also be utilized in the adjustment of the thickness of material such as milled or calendered sheets of steel, rubber, paper, or other sheeted material by measuring the thickness at a number of successive points on the sheet and then making an adjustment of the mill or calender rolls to increase or diminish the average thickness of the sheet as obtained by integrating the readings taken at the successive points thereof.

The invention may further be used in achieving average uniformity of continuous strip material, and more especially for automatically producing continuous strips of extruded plastic material of uniform weight for a unit of length, as for instance, in the production of a continuous rubber tread slab in the manufacture of tires, which slab subsequently is cut into individual tread slabs of determinate length for incorporation in a pneumatic tire casing. Since the weight of the slab is a function of its width, thickness and composition, it will be seen that substantial control of the size of the slab is effected when its average weight is controlled.

By adjusting the weight of the slab by a control means which is effected by the average weight of a number of integrated successive portions of the slab, the effect of local inequalities is eliminated and average uniformity is attained with a minimum number of adjustments of the slab producing means.

The chief objects of the invention are to produce uniform average conditions; and to provide an improved method and apparatus for accomplishing the aforesaid object. A further object is to provide apparatus that will return to a determinate point of starting after each adjustment phase of operation. Other objects will be manifest.

While the invention may be utilized in the adjustment of any average condition, apparatus for the production of a continuous tread slab of average uniformity will be illustrated herein as an illustrative embodiment of the invention.

The apparatus comprises the usual extruding machine for forming a continuous strip of material, a continuously driven conveyor for removing the said strip, and means for automatically correlating the linear speed of the conveyor with the speed of extrusion of the strip according as the strip is over or under a determinate unit weight, to produce such a tension or compression in the strip as will restore it to said determinate unit weight.

Of the accompanying drawings:

Figure 1 is a plan view of apparatus embodying the invention, in its preferred form;

Figure 2 is a side elevation thereof viewed from line 2—2;

Figure 3 is a plan view, on a larger scale, of a portion of the apparatus shown in Figure 1, as viewed from the line 3—3 of Figure 2, the same consisting of mechanical means for adjusting a conveyor-speed-control mechanism;

Figure 4 is a section on the line 4—4 of Figure 3;

Figure 5 is a section on the line 5—5 of Figure 1;

Figure 6 is a side elevation of the mechanism shown in Figure 5, as viewed from the right thereof, parts being broken away and in section;

Figure 7 is a section on the line 7—7 of Figure 6;

Figure 8 is a section on the line 8—8 of Figure 2 showing in plan, mechanism comprising a source of light, a light sensitive device, and means whereby variations in the weight of the work effect corresponding variations of the intervals that the light responsive device is exposed to the light source;

Figure 9 is a section on the line 9—9 of Figure 8;

Figure 10 is a section on the line 10—10 of Figure 8;

Figure 11 is a section on the line 11—11 of Figure 8;

Figure 12 is a plan view of an integrating device;

Figure 13 is a side elevation of the integrator, as viewed from the right of Figure 12;

Figure 14 is a front elevation of the integrator, as viewed from the near side of Figure 12;

Figure 15 is a section on the line 15—15 of Figure 12;

Figure 16 is a section on the line 16—16 of Figure 12;

Figure 17 is a front elevation of a timer device;

Figure 23:
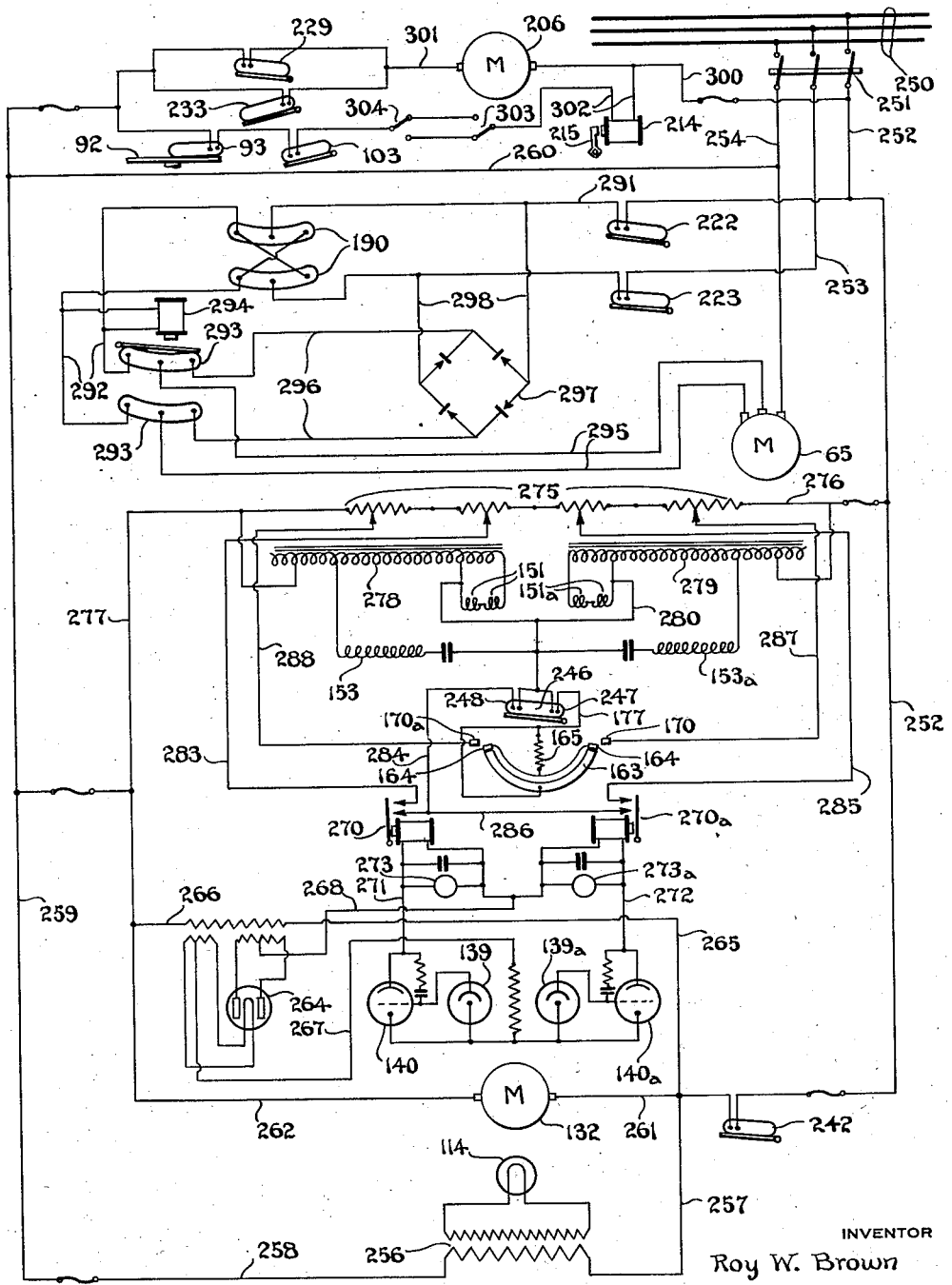

Figures 18, 19, 20 and 21 and 22 are sections on the lines 18—18, 19—19, 20—20, 21—21 and 22—22 respectively of Figure 17, and Figure 23 is a wiring diagram of electrical elements of the apparatus.

Referring to the drawings, 25 is an extruding machine of known or preferred type driven by a motor 26, and 27 is a continuous strip of plastic, unvulcanized, rubber composition extruded therefrom. Adjacent the delivery head of the extruding machine 25 is a framework 28 carrying a conveyor that for convenience is made in two endless sections 29, 30, said sections being longitudinally spaced apart from each other so that a numbering device comprises a suitable die-roller 31 over which the strip 27 passes in moving from conveyor belt 29 to conveyor belt 30, and a cooperating presser roller 32 that rests upon the work and presses it against said die-roller 31. The conveyor belts 29, 30 move in the same direction at the same speed, and to this end the shafts 33, 34 of the adjacent supporting rollers of the respective conveyor belts are provided with respective sprockets that are connected by a sprocket chain 35, shown best in Figure 1. A sprocket chain 36, Figure 1, may be provided for driving the die-roller 31 from the driven shaft 33. At its delivery end the conveyor belt 30 is carried upon a supporting roller 37 mounted upon a shaft 38.

Below and beyond the conveyor belt 30 is a cooling system comprising three belt conveyors 40, 41 and 42 that travel at the same speed as belt 30, and receive the work from the latter and convey it back and forth while a cooling spray is directed upon it.

For driving the aforesaid conveyor belts in unison, the shaft 34 of conveyor belt 30 is provided with a sprocket that is connected by sprocket chain 44 with a sprocket 45 on shaft 46 of a reduction gear device 47, and a second sprocket on shaft 46 is connected by a sprocket chain 48 with a sprocket 49 on shaft 50 of supporting roller 51 of conveyor belt 40. Suitable means (not shown) is provided whereby the conveyor belts 41, 42 are driven from the belt 40.

The reduction gear device 47 is driven by means of an oil motor 53 to which it is directly connected, and said oil motor is driven by an oil gear 54 to which it is connected by fluid conducting pipes 55, 56. The oil gear 54 is driven by an electrical motor 57, and is adjustable to control the speed of oil motor 53, and consequently the conveyor belts, either manually, or automatically by electrical devices.

For manual adjustment of the oil gear 54, the control shaft 58 thereof (see Figure 3) is provided with a sprocket 59 connected by a sprocket chain 60 to a sprocket 61 on a shaft 62 that is journaled in suitable brackets mounted upon the framework 28. The opposite ends of shaft 62 are provided with respective hand-wheels 63, at opposite sides of the framework, by means of which the control shaft 58 may be turned through the connections described.

Automatic adjustment of control shaft 58 is effected by means of a reversible electric motor 65 that has built-in reduction gear mechanism including a driving pinion 66. The latter is adapted to mesh with a gear 68 fixed on a shaft 69 with a gear 70, said shaft 69 being journaled in a fixed bracket 71. The gear 70 is meshed with a gear 72 on control shaft 58 of oil gear 54, the gears 68, 70 being of such relative sizes as to effect further reduction of speed between pinion 66 and gear 72. The motor 65 is mounted for axial movement whereby its pinion 66 may be in mesh or out of mesh with gear 68, the latter condition obtaining when the apparatus is arranged for manual adjustment of control shaft 58. To this end the motor 65 is mounted upon a base plate 74 that is slidably mounted upon a supporting structure 75. The latter is formed beneath base plate 74, with an elongate slot 76 through which projects a pair of spaced lugs 77, 77 extending downwardly from said base plate. Positioned between said lugs and engaging both of them is an eccentric 78 that is mounted upon a shaft 79 that is journaled in the structure 75, transversely thereof. A projecting end of shaft 79 is provided with an operating lever 80, and an adjustable clip 81 is mounted upon structure 75 for engaging and holding lever 80 in place when the motor 65 is so positioned that pinion 66 meshes with gear 68. A rest 82 is provided for lever 80 in its alternative position. Bolts 83, 83 may be provided for holding the base plate 74 securely in place in either position of the motor.

Means subsequently to be described is provided for driving the motor 65 in alternative directions that correspond to overweight or underweight conditions of the strip 27, and for varying intervals that have a direct relation to the extent of said overweight or underweight. Means also is provided for disconnecting the entire conveyor-speed-adjusting mechanism, including motor 65, whenever the apparatus is idle and the conveyors are not in motion, said means comprising a centrifugal switch mechanism generally designated 85 and shown in detail in Figures 5 to 7.

The centrifugal switch mechanism is enclosed in a box mounted upon framework 28 beside conveyor roller 37, and comprises a pinion 87 that extends from said box and meshes with a gear 88 mounted upon the shaft 38 of said roller 37. Interiorly of said box, the shaft of pinion 87 carries a bevel gear 89 meshed with a bevel gear 90 on the lower end of a vertical shaft 91. The upper end of shaft 91 carries a rotor or plate 92 and eccentrically mounted upon the latter is a mercury switch 93, the arrangement being such that said switch is closed when the rotor is rotating and conveyor 30 moving and open when they are stationary.

Means also is provided for disconnecting the entire conveyor-speed-adjusting mechanism whenever the trailing end of strip 27 passes off the moving conveyor 30, and for automatically reconnecting said mechanism whenever the leading end of the succeeding strip passes the same point. To this end a rock shaft 95, Figure 6, is journaled in the wall of a switch box 96 that is mounted upon framework 28 just beyond roller 37. A similar rock shaft is journaled in a bracket 97 on the opposite side of the framework. The adjacent ends of said rock shafts carry respective radial arms 98, the free ends of which carry a rod 99 extending transversely of the framework, parallel to and adjacent roller 37. A rotatable sleeve 100 is mounted upon rod 99, the arrangement being such that the strip 27 is in engagement with sleeve 100 when passing from conveyor 30 to conveyor 49, the weight of the strip holding rod 99 and arms 98 in the positions shown in full lines in Figure 6. The arms 98 are provided with respective rearwardly extending counterweights 101 adapted to tilt them and rod 99 to the broken line position of Figure 6 when no strip is resting upon said rod. Within switch box 96, rock shaft 95 carries a bracket 102 upon which is mounted a mercury switch 103, the latter being closed when tilted to the full line position shown, during the normal operation of the apparatus, and open when there is no strip 27 resting on rod 99.

Broadly, the linear speed of the conveyor belts 29, 30 is controlled by the direction of rotation and duration of time that motor 65 is running, which factors are controlled by the length of time that a pair of light-responsive devices are exposed alternatively to a constant light source, and the time of exposure of the light sensitive devices is controlled by the magnitude of the overweight or underweight of the strip 27.

The overweight or underweight of the strip 27 is determined by a weighing scale 105 of known type that is suitably constructed to accomplish the purpose desired. To this end the scale is mounted upon the top of framework 28, over the conveyor belt 30, and is provided with a depending yoke 106 that carries a roller 107 upon which the upper reach of belt 30 rests. The scale has an upwardly extending swinging arm or indicator 108, Figure 11, that is exactly in vertical position when the work on belt 30 is exactly the weight desired, said arm swinging to one side or the other according as the weight of strip 27 varies from the desired normal. Vertically adjustable rollers 109, 109 are positioned beneath belt 30 on each side of roller 107 for adjusting the weight of the material suspended from yoke 106 to balance the scale and bring the arm 108 thereof initially to normal position.

Positioned atop of scale 105 is a closed housing 111 having an elongate slot 112 in its bottom, centrally thereof through which scale arm 108 extends. Near one end of the housing 111 is a partition 113 of light and heat insulating material, and in the end-chamber of the housing defined thereby is a light-source consisting of an electric lamp 114 of considerable brilliance, say 500 watts. This end of the housing may be provided with a multiplicity of vanes 115, 115 to conduct heat therefrom. The partition 113 is formed with a horizontal, rectangular slot 116, and mounted over said slot, exteriorly of the lamp-chamber, is a pair of lenses consisting of a plano-convex lens 117, and a plano-cylindrical lens 118 having its axis parallel to slot 116. The function of these lenses is to transform the light passing through slot 116 into a horizontal beam or band of light of uniform length and of constantly diminishing width, said beam conveying to a focal line F some distance from said lenses as is most clearly shown in Figures 8 and 9.

Between the aforesaid lenses and the focal line F is the free end of indicator arm 108, which arm carries an arcuate plate 120 that intersects the light beam and cuts off all of it except that portion which passes through a relatively narrow, vertical slot 121, Figure 11, formed in said plate and arm. Between plate 120 and the focal line F is a stationary plate 122 formed with an elongate horizontal slot 123 of slightly less width than the light beam at this point. Thus it will be seen that only a small patch of light of great and uniform intensity falls upon the focal line F, and that its position longitudinally of said focal line is controlled by the overweight or underweight condition of the strip 27 as denoted by the position of the indicator arm 108.

A rotary shutter 125 has its axis coincident with the focal line F. Said shutter is a hollow, cylindrical structure with closed ends, and is journaled upon end bearings 126, 126, Figure 10, carried by respective spindles 127 adjustably mounted in a suitable bracket 128, which bracket also carries the filter plate 122. One end wall of the shutter 125 is provided with a gear 129 that is meshed with the driving pinion 130 of a reduction gear device 131 mounted upon one end of a motor 132. The latter drives the shutter at about 24 revolutions a minute. The shell or cylindrical wall of the shutter 125 is cut away at each end thereof, and at diametrically opposite points, to provide four apertures 134, 134 in the shell, which apertures are substantially of ogival shape, their apices being blunt and directed toward the middle of the shell, but spaced from the latter so that there is an imperforate circumferential region at the middle of the shell. The apertures 134 permit the small beam of light from lamp 114 periodically to reach the focal point F at the axis of the shutter whenever the strip 27 is over or under gauge and said beam of light is diverted by arm 108 to either side of the imperforate medial region of the shutter shell.

When the strip is exactly the proper weight, the light beam falls on the imperforate medial region of the shutter and thus is cut off. Because of the rotation of shutter 125, the beam of light that reaches focal line F is periodically cut off, and because of the peculiar shape of apertures 134, the intervals that the beam reaches said focal line will vary in duration according to the position of the beam longitudinally of said focal line and shutter, being of short duration when the beam falls near the middle of the shutter and longer when the beam falls adjacent the respective ends of the shutter. Because the apertures 134 at opposite ends of the shutter are symmetrical in shape and disposed diametrically opposite each other, such light as reaches the focal line F continues therebeyond and passes out the opposite side of the shutter. It will thus be seen that when the strip 27 is overweight the beam of light will pass through one end of the shutter and when the strip is underweight it will pass through the opposite end thereof, and that the intervals that the beam passes through the shutter will vary in duration in direct proportion to the extent of said overweight or underweight condition.

At the side of the shutter 125 opposite the filter plate 122 is a frame 136 formed with an elongate, horizontal slot 137, said frame supporting a pair of plano-convex lenses 138, 138a. The latter are arranged side by side in alignment with the apertures 134 in the opposite ends of the shutter shell. Said lenses are adapted to intercept the beam of light passing through the shutter 125 and slot 137 and to refract said beam toward respective light responsive devices. Lens 138 deflects the beam of light passing through the shutter when the strip 27 is underweight, and directs it against an electric eye 139. Lens 138a deflects the beam against electric eye 139a when said strip is overweight. Grid glow tubes 140, 140a are positioned beside the respective electric eyes 139, 139a in the housing 114, and operate in conjunction with them as subsequently will be explained.

Non-uniformity of weight of the strip 27 may be the result of lumps in the stock, or because of changes in the temperature and/or consistency of the stock. It is not desired to adjust the speed of the conveyor belt because of temporary or local conditions in the stock, and for this reason adjustment to the drive of motor 65 is made only about every thirty-five seconds, this time interval being controlled by a timer mechanism mounted in an instrument cabinet 142, Figure 1, which may be positioned adjacent the apparatus. The stock is gauged at the rate of twenty-four times a minute or once every two and one-half seconds by the light-responsive mechanism previously described, and the mean condition revealed by said gauging controls the duration and direction of drive of motor 65 at the adjusting period. The mean condition of the stock is obtained by integrating mechanism controlled by the light responsive devices, said integrating mechanism being mounted in instrument cabinet 142, and being illustrated in Figures 12 to 16 of the drawings.

The integrating mechanism comprises a disc motor of which 144, 145 are the respective top and bottom frame plates, 146, 146 are corner pillars connected thereto and holding them in spaced relation, and 147 is a depending bracket secured to top plate 144. Journaled in the bracket 147 is a rotor shaft 148 that has a rotor disc 149 mounted centrally thereon, said shaft 148 extending upwardly through top plate 144 and having its upper end formed with a driving pinion 150. The disc 149 is driven alternatively in opposite directions by opposed magnetic coils located at diametrically opposite points with relation to said disc. The coils at one side of the disc comprise a pair of series-connected field or current coils 151, 151 positioned above the disc 149 and supported by bracket 152 from top plate 144, and a potential coil 153 positioned below disc 149 and supported mainly by bracket 147.

The aforesaid coils drive the disc 149 in counterclockwise direction as viewed in Figure 12 when the strip 27 is underweight. The disc 149 is driven in the opposite direction when the work is overweight by the coils on the opposite side of the disc, which coils consist of field coils 151a, 151a carried by bracket 152a, and a potential coil 153a carried by bracket 147. The pinion 150 on shaft 148 is meshed with a gear 155 that is mounted upon a vertical shaft 156, Figure 12, that is journaled in a bearing box 157 on top plate 144. The shaft 156 also has fixed thereon a gear 158 that is meshed with a gear 159 fixed upon a vertical shaft 160 journaled in a bearing box 161 on top plate 144, as is most clearly shown in Figure 15. Concentrically mounted upon the top face of gear 159 is an annular structure 162 of dielectric material, and mounted flush upon the top face of said structure is an arcuate, metal contact plate 163 of somewhat less than 180 degrees in extent. The respective end portions of contact plate 163 consist of relatively short sections 164, 164 that are insulated from the main section. The plate 163 is electrically connected through connections subsequently to be described, and plate sections 164 are similarly connected through a resistance coil 165 supported upon gear 159 concentrically with structure 162.

A triangular plate 167 of dielectric material is supported upon corner posts 168, 168 rising from top plate 144 of the integrator said plate 167 overlying gear 159 and structure 162. Secured to the underside of plate 167 are brackets 169, 169 upon which respective metal brushes 170, 170a are pivotally mounted, said brushes extending in diametrically opposite directions and having their free ends in engagement with the top surface of dielectric structure 162 or contact plates 163, 164 according to the angular position of gear 159 which in turn is controlled by the disc motor.

Respective compression springs 171, 171 mounted in housing shells 172, 172 on plate 167 are provided for urging brushes 170, 170a into contact with said contact plate. Electrical connection with contact plate 163 and resistance coil 165 is made through a metal bridge 173 that is mounted upon dielectric plate 167 and spanning the axis of shaft 160, an axial rod 174 having a sliding fit in an aperture in said bridge extending downwardly therefrom into a metal cup 175 that is mounted upon the upper end of shaft 160 so as to rotate therewith, but being insulated therefrom. A bath of mercury 176 in cup 175 makes good electrical contact between rod 174 and cup 175, and a conductor 177 extends from said cup to resistance coil 165 and to contact plate 163. The arcuate extent of the contact plate 163 and plate sections 164 is such that it is impossible for both brushes 170, 170a to be in touch with them at the same time, and at one position of the integrator, called the neutral position and shown in Figure 12, both of said brushes are upon dielectric material 162.

The arrangement is such that when the strip 27 is underweight, the coils 151, 153 are energized to drive the rotor disc 149 in counterclockwise direction, the coils 151a, 153a driving the disc in the opposite direction when the strip is overweight. The contact members 163, 164 rotate in the same direction as disc 149 when the latter is driven, with the result that either brush 170 or 170a may be engaged thereby. The presence of the resistance coil 165 in the electrical connection of members 164 prevents arcing when the brushes engage the latter or move therefrom onto member 163. If the work remains in extreme underweight or overweight condition during the entire interval between adjusting operations, the disc 149 will be turned angularly a maximum of 160 degrees.

Concentrically mounted upon the perimeter of dielectric structure 162, in spaced relation thereto, is an annular cam structure 180, the upper marginal face of which is formed with a cam surface comprising relatively short regions 181, 181 of intermediate height disposed at diametrically opposite points of the cam, an elevated region 182 extending from one region 181 to the other on one side of the cam, and a depressed region 183 of equal length on the opposite side of the cam. Engaging said cam surface is a cam roller 184 on the free end of a lever arm 185 that is attached to one end of a rock-shaft 186 that is journaled in a pair of spaced arms 187 of a bracket that is mounted upon top plate 144. Between said arms said rock-shaft 186 carries an angular rocker arm 188, and attached to opposite sides thereof by spring clips 189, 189 are two 3-pole mercury switches 190, 190. These switches are interconnected, as shown in Figure 23 so as to constitute, in effect, a single reversing switch controlling the direction of rotation of reversible motor 65, and preventing it from being driven if the mean condition of the work is at proper gauge. The cam 180 is so disposed angularly with relation to dielectric member 162 that when the latter is in the neutral position shown in Figure 12, cam surface 181 is in engagement with cam roller 184 and mercury switches 190 are in the neutral position shown best in Figure 16, at which time the switches 190 are open, the motor 65 is idle, and the strip 27 is exactly the proper gauge. Under these conditions, rotation of cam 180 in either direction will tilt switches 190 one way or the other and thus permit the motor 65 to be driven in the proper direction to adjust the speed of conveyor belts 29, 30.

Since the length of time that the disc motor is driven in either direction is in direct proportion to the extent of the off-gauge condition of the strip 27, it will be seen that the angular position of cam 180, between speed adjusting operations, represents the mean condition of the work rather than its instantaneous condition.

The timer mechanism hereinbefore mentioned is shown in Figures 17 to 22 inclusive. Said timer mechanism comprises a vertically arranged base-plate 192 and two spaced-apart brackets 193, 194 secured thereto, said brackets being connected to each other by a pair of tie-rods 195, 196. Said brackets also support a cam shaft 197 and a rock-shaft 198, which shafts are journaled at their respective end portions in said brackets. One end portion of cam shaft 197 extends beyond bracket 194 and has journaled thereon a gear 199 that is positioned between a pair of friction discs 200, 200, the latter being backed by metal discs 201, 201 that are keyed to shaft 197, the outermost disc 201 being movable axially of the shaft. A leaf spring 202 mounted between the outermost disc 201 and a nut 203 on the end of the cam shaft urges the friction discs 200 and gear 199 into frictional driving engagement. The arrangement is such that the cam shaft 197 rotates with gear 199, but the latter may slip on the shaft if the shaft should refuse to rotate because of jamming of the cams or for any other cause such as the application of braking means to the cam shaft. The gear 199 is driven by a pinion 204 with which it is meshed, said gear 204 being a part of reduction gearing, that is generally designated 205, associated with a motor 206 that is carried by a bracket support 207 secured to end bracket 194 of the timing device. Keyed to cam shaft 197 is a sleeve 208 having thereon three disc cams 209, 210 and 211 respectively, and a single-tooth ratchet 212, said cams and ratchet serving purposes presently to be described. During normal operation, the motor 206 is constantly driven.

Mounted upon base-plate 192, beside bracket 193, is a solenoid coil 214, the armature 215 of which is mounted for pivotal movement by being secured at its lower margin to a shaft 216 that is journaled in a pair of bearing brackets 217, 217 on said base-plate. Mounted upon a projecting end portion of shaft 216 is a lever arm 218 that is connected by an adjustable link 219 to the free end of a rocker arm 220 mounted upon rock-shaft 198. Thus the latter is given determinate angular movement when the solenoid coil 214 is energized, and returned to a determinate inoperative position when said coil is de-energized. The operation of coil 214 is controlled by switches 83 and 103, which switches are connected in series, with the result that said coil is energized whenever conveyor belt 30 is being driven and a strip 27 is passing therefrom onto conveyor 40.

Figures 21, 22:
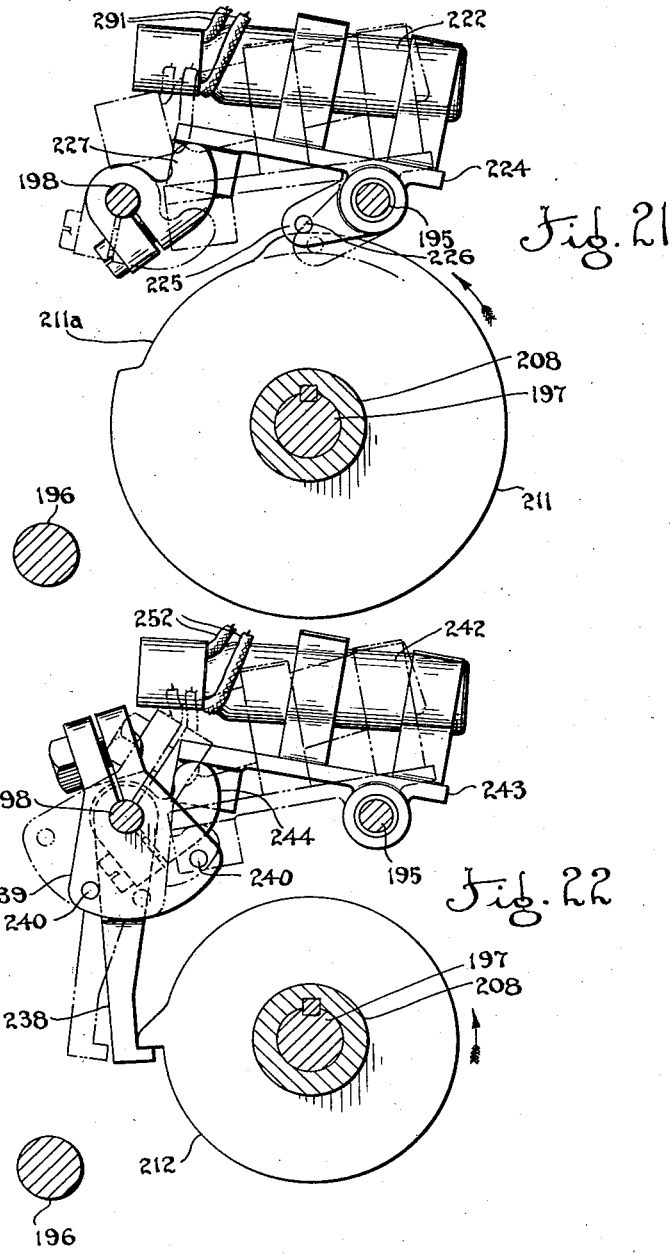

As hereinbefore stated, motor 65 is driven periodically about every 31 seconds, the motor being controlled by a pair of mercury switches 222, 223 across two of the wires in its circuit. As is best shown in Figures 17 and 21, switches 222, 223 are mounted upon a common support 224 that is pivotally mounted at one side upon tie-rod 195. The support 224 is formed with an arm 225 that has a cam roller 226 on its free end, which cam roller normally rests upon cam 211. Throughout the major portion of its periphery the cam 211 supports member 224 in the full line position shown in Figure 21, in which position switches 222, 223 are open and motor 65 is idle. Less than one-fourth the periphery of cam 211 is formed with a depressed cam surface 211a which permits support 224 to tilt to the broken line position shown in Figure 21 to close the said switches and start the motor. The cam 211 makes one complete revolution every thirty-five seconds, the length of surface 211a being such that the motor 65 may be driven for a maximum of 5.6 seconds during each revolution of the cam.

A dog 227 on rock-shaft 198 has its free end positioned beneath the free end of switch support 224 so as to lift the latter and open the switches thereon whenever solenoid coil 214 is de-energized. This will stop the drive of motor 65 if it is then being driven. Solenoid coil 214 also controls the drive of timer motor 206 through the agency of a mercury switch 229, which switch is mounted upon a support 230 that is pivotally mounted at one side upon tie-rod 195 (see Figure 19). The free end of support 230 is engageable by a dog 231 mounted upon rock-shaft 198. The arrangement is such that the switch 229 is in the broken line position of Figure 19 and closed when the coil 214 is energized, thus delivering current to motor 206. When coil 214 is de-energized, dog 231 opens switch 229.

It is desirable that the timing device always start and stop at the same angular position of its cams, and to this end a mercury switch 233 is provided in the circuit of motor 206. Switch 233 is mounted upon a support 234 that is pivotally mounted at one side upon tie-rod 195. A lever arm 235 is formed on support 234 that has its free end provided with a cam roller 236 that rests upon the periphery of cam 209. The latter normally holds the switch 233 in the broken line position shown in Figure 18, in which position the switch is closed so that power may be delivered therethrough to motor 206. There is a short notch or depression 209a in cam 209, said depression acting to tilt switch 233 to the full line position shown to open it. If will be observed with reference to Figure 23 that the opening of switch 233 will not stop motor 206 unless switch 229 also is open, the arrangement being such that no matter when switch 229 is opened by solenoid 214, motor 206 continues to run until stopped by cam 209 opening switch 233.

This construction assures that the cams always start and stop at the same angular position. One important result of this arrangement will be apparent from reference to Figure 21 in which it will be seen that when the apparatus is started after being stopped, cam 211 makes more than three-fourths of a revolution before closing switches 222, 223 to start motor 65. This allows a substantial amount of work 27 initially to pass over conveyors 30, 40 and several gauging operations to be made before any adjustment of the speed of said conveyors is made.

To prevent over-run of motor 206, when switches 229, 223 are opened, from carrying cams 209, 210 and 211 past stopping position, rock-shaft 198 has pivotally mounted thereon a depending pawl 238, the free end of which is movable into the orbit of the single tooth of ratchet 212. A forked bracket 239 is fixedly mounted upon rock-shaft 198 astraddle pawl 238, the forks thereof being connected by spaced pins 240, 240 disposed before and behind pawl 238. Thus when the solenoid coil 214 is energized or de-energized, the pins 240 swing the pawl 238 out of or into the orbit of the single tooth of ratchet 212. The cam shaft 197 is positively stopped when said ratchet engages the pawl, notwithstanding over-run of motor 206 which merely causes slippage between gear 199 and friction discs 200. The construction is such that there is lost motion between rock-shaft 198 and pawl 238 whereby exactness of adjustment between solenoid 214 and the pawl is obviated, and when the solenoid is energized, the armature 215 attains momentum before it is required to withdraw the pawl from the ratchet 212 so that less power is required to overcome the friction therebetween.

When the solenoid 214 is de-energized for any of the reasons mentioned, it is desirable to discontinue stock-gauging operations and to this end a mercury switch 242 is included in the circuit that comprises lamp 114 and motor 132. The switch 242 is mounted upon a support 243 that is pivotally mounted at one end upon tie-rod 195, the free end of said support being engageable with a dog 244 on rock-shaft 198. The switch 242 is closed when in the broken line position shown in Figure 22, and open when tilted by dog 244 to the full line position shown therein, when the solenoid 214 is de-energized.

The timer mechanism also includes a switch that is in the integrator circuit and which allows the disc motor to be driven in either direction according to the underweight or overweight condition of the strip 27, during the intervals between belt-speed-adjusting operations, and which causes the motor disc and cam 180 to return to neutral position during the adjusting operation, the time required for the cam to reach said neutral position being the interval that motor 65 will be driven. Said switch, best shown in Figure 20, is a double mercury switch generally designated 246 wherein the contacts 247 at one end thereof are broken before the contacts 248 at the other end are made. Switch 246 is mounted upon a support 249 that is pivotally mounted at one end upon tie-rod 195. Swiveled on the same tie-rod in association with support 249 is a hub 250 formed with an arm 251 having a cam roller 252 in its free end bearing upon the margin of the cam 210. Said hub 250 also is formed with an arm 253 extending forwardly beneath support 249, and with a rearwardly extending counterweight 254. A dog 255 is mounted upon rock-shaft 198 in position to engage the free forward end of support 249. The major portion of the cam surface of cam 210 is such as to tilt hub 250 to the angular position shown in broken lines in Figure 20, the support 249 resting by gravity upon arm 253 whereby switch contacts 248 of switch 246 are closed and switch contacts 247 are open.

The cam 210 includes a depressed portion 210a adapted to cause the switch 246 to tilt to the alternative position shown in full lines in the drawings. The cam 210 is so angularly positioned with relation to cam 211 that switch 246 is moved to said full line position immediately after switches 222, 223 in the circuit of motor 65 are closed, and is tilted to the opposite position immediately after switches 222, 223 are opened. The construction permits switch 246 to be tilted to full line position by dog 255 at any time, and when the motor 206 stops after solenoid 214 is de-energized, cam 210 will stop in the position shown in Figure 20.

The apparatus comprises other electrical devices mounted in cabinet 142, said devices being of standard construction so as not to require detail illustration, but which are shown diagrammatically in the wiring diagram, Figure 23, to which attention now is directed.

Power is supplied to the apparatus from a 3-phase, 110-volt, A. C. power line 250. Associated therewith is a 3-pole master switch 251 by means of which three conductors 252, 253 and 254 respectively are connected with said power line. The three conductors mentioned furnish power for four circuits, namely, the timer circuit, the circuit for adjusting motor 65, the integrator circuit, and the stock-gauging circuit.

In the stock-gauging circuit is a step-up transformer 256 having connection on one side, through conductor 257, with power lead 252, and having connection on the other side, through conductors 258, 259 and 260 with power lead 254. Connected with transformer 256 is lamp 114, and switch 242 in power lead 252 controls the electrical current to said transformer. Said switch 242 also controls shutter-motor 132, the latter being connected to power lead 252 through conductor 261 and to conductor 259 through conductor 262.

A full wave rectifier 264 is connected by conductor 265 to power line 252 and by conductor 266 to power conductor 262. Said rectifier transforms the A. C. power current to direct current for the electric eyes 139, 139a and grid glow tubes 140, 140a to which it is connected by conductor 267. Another lead 268 from rectifier 264 extends to two relay coils 270, 270a respectively, the other side of relay 270 being connected by conductor 271 to grid glow tube 140 and the other side of relay 270a being connected by conductor 272 to grid glow tube 140a. The arrangement is such that relay 270 is operated by grid glow tube 140 when the work 27 is underweight, and relay 270a is operated by grid glow tube 140a when the work is overweight. Lamps 273, 273a may be associated with relays 270, 270a respectively for giving visible indication as to the condition of the work at all times. The switch 242 also controls power to the rectifier 264.

The integrator circuit comprises a potentiometer 275 connected by conductor 276 with power lead 252 and connected by conductor 277 with power conductor 259. A transformer 278 is connected to conductor 277, and a transformer 279 is connected to conductor 276. Field coils 151 of the disc motor are connected with transformer 278, and field coils 151a are connected with transformer 279. Said field coils are connected to each other by conductor 280 which in turn is connected by conductor 281 with one contact of each pair of switch contacts 247, 248 of mercury switch 246. Potential coil 153 of the disc motor is connected to transformer 278 and to conductor 281, and potential coil 153a is connected to transformer 279 and to conductor 281. Associated with relay 270 is a pair of normally open contacts that are closed by operation of said relay, one of said contacts being connected by conductor 283 to a tap off potentiometer 275 and the other contact being connected by conductor to the other of switch contacts 248 of swi Relay 270a is provided with a sim contacts, one of which is connecte 285 to another tap off pote the other is connected by conductor 286 to conductor 284. A third tap from the potentiometer is connected through conductor 287 to brush 170 of the disc motor. A fourth tap from the potentiometer is connected through conductor 288 to brush 170a of the disc motor. A conductor 177 extends from the other of switch contacts 247 to contact plate 163 of the integrator and, through resistance coil 165, to the plate sections 164 thereof.

The arrangement is such that during normal operation of the apparatus, while switch contacts 248 are closed, underweight and/or overweight conditions of the strip 27 alternatively periodically operate relays 270, 270a whereby coils 151, 151a, 153, 153a are energized to drive the disc motor in counterclockwise or clockwise direction respectively, accordingly as current from the potentiometer flows to the coils over conductor 283 or 285. Thus the angular position of contact plate 163 at any time during the interval switch 248 is closed represents the mean condition of the strip 27 since the previous conveyor speed adjusting operation. If the mean condition of the strip 27 is underweight, the contact plate 163 will have moved in counterclockwise direction from neutral position and will be in contact with brush 170. If it has moved in clockwise direction it will be in contact with brush 170a. In either case the switches 190 on the integrator will be closed. When the timing mechanism operates to tilt switch 246 to open contacts 248 and close contacts 247 thereof, current from the potentiometer flows to the disc motor coils over conductors 287 or 288 and is approximately 90° out of phase from the current previously flowing to said coils, so that the motor disc and contact plate 163 move back to neutral position, the interval required to effect this depending upon the angular distance from neutral that the contact plate previously has been moved by the work-gauging mechanism, in no event exceeding 5.6 seconds.

When the contact plate 163 reaches neutral position it is out of contact with either brush 170 or 170a, so that further angular movement of the disc motor is prevented and as it comes to rest the switches 190 tilt to neutral position. This may happen of course before the timing device again tilts switch 246, and it serves to stop the drive of adjusting motor 65. The circuit for adjusting motor 65 comprises power lead 291 connected to power lead 252, and power lead 253, switches 222 and 223 being mounted in leads 291, 253 respectively. The leads 291, 253 are connected to the middle poles of the respective switches 190. From switches 190 a pair of conductor wires 292 extend to one of the end poles of a pair of 3-pole mercury switches 293, 293 that are mounted to be rocked by a relay 294 across conductors 292. From the middle poles of switches 293 a pair of conductor wires 295 extend to motor 65, the other conductor to said motor being power lead 254. From the other end poles of switches 293, a pair of conductors 296 extend to a rectifier 297 connected to power leads 253, 291 by conductors 298. The arrangement is such that when switches 222 and 223 are closed and switches 190 are tilted either way from neutral position, relay 294 is energized and alternating current flows to motor 65 to drive the same. When switches 222, 223 open or when switches 190 move to neutral position to open the circuit, relay 294 is de-energized and switches 293 tilt to the position shown whereby direct current from rectifier 297 flows to motor 65 and acts as a magnetic brake to stop rotation thereof. It will be seen that switches 190 constitute a reversing switch and that motor 65 is driven in one direcion or the other as the switches 190 are tilted one way or the other from neutral position.

For driving the motor 206 of the timing device, one side thereof is connected by conductor 300 to power lead 252 and its other side is connected by conductor 301 to power lead 259. Switches 229 and 233 are mounted in series in conductor 301 so as to stop rotation of motor 206 when solenoid 214 is de-energized as previously explained. Power is supplied to solenoid coil 214 through a pair of conductors 302, 302, one of which is connected to conductor 300 and the other to power lead 259. In one of said conductors 302 is mounted a pair of series-connected, manually operated switches 303, 304. These switches preferably are mounted adjacent opposite ends of the apparatus so that an operator may conveniently start or stop the operation of the adjusting apparatus at will. Switches 93 and 103 also are mounted in this same conductor 302 so as automatically to de-energize the solenoid 214 as previously explained.

The drawings (Figures 1 and 2) show the apparatus as it appears with motor 26 running, extruding machine 25 forming a continuous strip of plastic material 27, and motor 57 running so that conveyor belts 29, 30 and 40 are driven to feed the strip 27 longitudinally. Thus switch 103 and centrifugal switch 93 are closed as shown in Figure 6. The various instrumentalities of the conveyor-speed-adjusting mechanism are shown in the inoperative position they assume when master switch 251 is open, or when either of switches 303, 304 is open. The wiring diagram, Figure 23, shows the electrical apparatus in this condition.

*Operation*

In the operation of the apparatus, assuming it to be in the condition shown, master switch 251 is closed and either switch 303, 304 closed. The first effect is to energize solenoid 214 and thereby to close switch 242 which controls the light-sensitive-gauging mechanism and disc motor, to withdraw pawl 238 from ratchet 212, and to close switch 229 so that motor 206 is driven to rotate cam-shaft 197 of the timing device. Immediately the cam-shaft starts rotating, cam 210 tilts switch 246 so that switch contacts 248 are closed and switch contacts 247 are opened. Closing of switch 242 causes lamp 114 to be lighted, and motor 132 to be driven to rotate shutter 125 with the result that as arm 108 is moved from vertical position by off-gauge condition of strip 27, a beam of light is periodically projected upon one or the other of the light-sensitive members 139 or 139a. This happens every two and one-half seconds, and the length of time that the beam remains on the light-sensitive device is in direct proportion to the extent that the strip is off gauge. The light-sensitive devices control the operation of relays 270, 270a, and through the latter control the direction and duration of rotation of the disc motor and contact plate 163 of the integrating device. The integrating device controls the position of switches 190, tilting them one way or the other according to the off-gauge condition of the work.

After the operations dscribed have continued for about 28 seconds, cam 211 tilts switches 222 and 223 to closed position, and almost immediately after, cam 210 tilts switch 246 so as to open contacts 248 and close contacts 247 therein. Closing of switches 222, 223 causes motor 65 to be driven to adjust oil gear 54 and thus to alter the speed of conveyor belts 29, 30 and 40, the direction of rotation of motor 65 depending upon the direction in which switches 190 of the integrator are tilted, whereby said conveyors are speeded up if the strip 27 is overweight and slowed down if the strip is underweight.

The tilting of switch 246 causes the disc motor to be driven back to neutral position, which, when attained, tilts switches 190 to neutral position and opens the circuit of motor 65 to stop the latter, and also opens relay 294 so that switches 293 are reversed to allow direct current to flow to motor 65 and operate as a magnetic brake thereon. The time required for the integrator to reach neutral position is never more than 5.6 seconds, which is the duration of the adjusting phase of the cycle of operation. At the conclusion of the adjusting phase, the timing device opens switches 222, 223 to open the circuit to motor 65 so that the latter is not driven when switches 190 are tilted by movement of the disc motor during the succeeding stock-gauging phase, which starts when switch 246 is tilted by cam 210 at the beginning of the next cycle of operation. This completes one cycle of operation, and it may be continuously repeated. Operation is suspended whenever solenoid 214 is de-energized, which may be accomplished by manually opening switches 251, 303 or 304, or by the automatic opening of switch 93 by the stopping of conveyor-motor 57, or automatic opening of switch 103 when the trailing end of strip 27 passes off conveyor 30. If operation is suspended for the latter reason, it is resumed automatically when the leading end of another strip 27 closes switch 103.

Intentional stopping of the apparatus preferably is effected by switches 303, 304 so that motor 206 will rotate until the cams reach a determinate stopping position, whereby the sequence of operations always will be exactly as described.

The invention is automatic in its operation, it produces work of uniform weight per unit of length, and accomplishes the other advantages set out in the foregoing statement of objects.

Modification may be resorted to without departing from the spirit of the invention or the scope of the appended claims, which are not limited wholly to the specific construction shown or exact procedure described.

What is claimed is:

1. The method which comprises continuously forming a strip of plastic material, continuously feeding the strip away from the point at which it is formed, periodically gauging the strip at a succession of regions longitudinally of the strip, and periodically adjusting the speed of said feed in accordance with the mean off-gauge condition of the strip as determined by a plurality of gauging operations.

2. The method which comprises continuously forming a strip of plastic material, continuously feeding the strip longitudinally away from the place at which it is formed, periodically gauging the strip at a succession of regions longitudinally of the strip, integrating the results of a plurality of gauging operations to obtain the mean condition of the strip, and then discontinuing the integrating operation and adjusting the speed of the feed in accordance with the mean off-gauge condition of the strip revealed by the integrating operation.

3. The method which comprises continuously forming a strip of plastic material, continuously feeding the strip longitudinally away from the place at which it is formed, progressively weighing the strip to indicate periodically its departure from a determinate weight for a determinate unit of length, integrating a plurality of results thus obtained, and then adjusting the speed of feed of the strip to compensate for the mean off-gauge condition disclosed by the integrating operation.

4. The method which comprises continuously forming a strip of plastic material, continuously feeding the strip longitudinally away from the place at which it is formed, progressively weighing the strip to indicate its departure from a determinate weight for a determinate unit of length, periodically translating the indicated off-gauge condition of the strip into a beam of light, the duration and location of which is a function of the magnitude of the overweight or underweight of the strip, translating the light beam into electrical energy, and utilizing the latter for controlling the adjusting of the speed of feed of the strip.

5. The method which comprises continuously forming a strip of plastic material, continuously feeding the strip longitudinally away from the place at which it is formed, progressively weighing the strip to indicate its departure from a determinate weight for a determinate unit of length, periodically translating the indicated off-gauge condition of the strip into a beam of light, the duration and location of which is a function of the magnitude of the underweight or overweight condition of the strip, translating the light beam into periodic electrical impulses, integrating a plurality of said impulses to obtain a mean result, and then adjusting the speed of feed of the strip in accordance with said result.

6. The method which comprises continuously forming a strip of plastic material, continuously feeding the strip longtiudinally away from the place at which it is formed, progressively weighing the strip to indicate its departure from a determinate unit weight, deflecting a light beam onto alternative points according as the strip is indicated to be underweight or overweight, periodically interrupting the light beam for intervals that are in proportion to the extent of the underweight or overweight of the strip, translating the light beam into electrical impulses, utilizing said impulses to produce motion in one direction or the other according to the location of the light beam and for intervals corresponding to the length of time it dwells in said locations, whereby a mean result is obtained, and then adjusting the speed of feed of the strip in accordance with said mean result.

7. In apparatus for achieving uniformity of continuous strip material, the combination of means for forming a continuous strip of material, means for continuously feeding the strip away as it is formed, and means for periodically adjusting the speed of feed of the strip in accordance with the mean off-gauge condition of the strip between speed-adjusting operations.

8. In apparatus of the character described, the combination of means for forming a continuous strip of plastic material, means for continuously feeding the strip away from the point at which it is formed, means for periodically gauging the strip at relatively brief intervals, and means for periodically adjusting the speed of feed of the strip in accordance with the mean off-gauge condition of the strip as determined by a plurality of gauging operations.

9. In apparatus of the character described, the combination of means for continuously forming a strip of plastic material, means for continuously feeding the strip longitudinally away from the place at which it is formed, means for periodically gauging the strip at relatively brief intervals, means for integrating the results of a plurality of integrating operations to obtain the mean condition of the strip, and means for discontinuing the integrating operation and adjusting the speed of feed of the strip in accordance with the mean off-gauge condition of the strip revealed by the integrating operation.

10. In apparatus of the character described, the combination of means for forming a continuous strip of plastic material, means for continuously feeding the strip longitudinally away from the strip-forming means, means for progressively weighing the strip to indicate periodically its departure from a determinate weight for a determinate unit of length, means for integrating a plurality of results thus obtained, and means for adjusting the speed of feed of the strip to compensate for the mean off-gauge condition disclosed by the integrating means.

11. In apparatus of the character described, the combination of means for forming a continuous strip of plastic material, means for continuously feeding the strip longitudinally away from the strip-forming means, means for adjusting the speed of feed of the strip, means for progressively weighing the strip to indicate its departure from a determinate weight for a determinate unit of length, means for periodically translating the indicated off-gauge condition of the strip into a beam of light, the duration and location of which is a function of the magnitude of the underweight or overweight of the strip, means for translating the light beam into electrical energy, and means for utilizing the latter for controlling adjustment of the speed of feed of the strip.

12. In apparatus of the character described, the combination of means for forming a continuous strip of plastic material, means for continuously feeding the strip longitudinally away from the strip-forming means, means for progressively weighing the strip to indicate its departure from a determinate weight for a determinate unit of length, means periodically translating the indicated off-gauge condition of the strip into a beam of light, the duration and location of which is a function of the magnitude of the underweight or overweight condition of the strip, means for translating the light beam into periodic electrical impulses, means for integrating a plurality of said impulses to obtain a mean result, and means for adjusting the speed of feed of the strip in accordance with said result.

13. In apparatus of the character described, the combination of means for forming a continuous strip of plastic material, means for continuously feeding the strip longitudinally away from said forming means, means for progressively weighing the strip to indicate its departure from a determinate unit weight, a light beam, means for deflecting the light beam onto alternative points according as the strip is underweight or overweight, means for periodically interrupting the beam of light for intervals that are in proportion to the extent of the underweight or overweight of the strip, means for translating said light beam into electrical impulses, means for utilizing said impulses to produce motion in one direction or the other in a movable member according to the location of the light beam and for intervals corresponding to the length of time it dwells in said locations, whereby a mean quantum of movement is obtained, and means for periodically adjusting the speed of feed of the strip in accordance with position of said movable member.

14. In apparatus of the character described, the combination of means for forming a continuous strip of plastic material, means for continuously feeding said strip longitudinally away from said forming means, means for periodically gauging the strip as it is so fed, an integrator adapted to integrate results of gauging operations for a determinate interval to obtain a mean result, means controlling the speed of feed of the strip adapted periodically to adjust to said speed, and means coordinating the operation of the integrator and the speed-adjusting means.

15. In apparatus of the character described, the combination of means for forming a continuous strip of plastic material and feeding it longitudinally as it is formed, means for periodically gauging the strip progressively as it is so fed, means for determining the mean off-gauge condition of the work as indicated by a plurality of gauging operations, and means controlled by said last mentioned means for bringing the work back to determinate gauge.

ROY W. BROWN.